United States Patent [19]

Suzuki

[11] Patent Number: 4,945,531

[45] Date of Patent: Jul. 31, 1990

[54] OPTICAL WAVELENGTH-DIVISION MULTIPLEX TRANSMISSION SYSTEM WITH AN OPTICAL FILTER FOR SPONTANEOUS EMISSION NOISE

[75] Inventor: Syuji Suzuki, Tokyo, Japan

[73] Assignee: NEC Corporation, Tokyo, Japan

[21] Appl. No.: 383,256

[22] Filed: Jul. 21, 1989

Related U.S. Application Data

[63] Continuation of Ser. No. 39,193, Apr. 16, 1987, abandoned.

[30] Foreign Application Priority Data

Apr. 17, 1986 [JP] Japan .................................. 61-89148

[51] Int. Cl.⁵ .............................................. H04J 14/02
[52] U.S. Cl. ........................................ 370/3; 356/352; 455/617
[58] Field of Search ........................... 370/3; 356/352; 455/617, 612, 601

[56] References Cited

U.S. PATENT DOCUMENTS

| | | | |
|---|---|---|---|
| 4,076,422 | 2/1978 | Kohno | 356/352 |
| 4,406,003 | 9/1983 | Eberly | 370/3 |
| 4,508,964 | 4/1985 | Gunning, III et al. | 356/352 |
| 4,807,227 | 2/1989 | Fujiwara | 370/3 |

FOREIGN PATENT DOCUMENTS

| | | | |
|---|---|---|---|
| 0005093 | 10/1979 | European Pat. Off. | 370/3 |
| 0146507 | 12/1978 | Japan | 370/3 |
| 0112131 | 9/1981 | Japan | 370/3 |

OTHER PUBLICATIONS

Simon, J. C., "Semiconductor Laser Amplifier for Single Mode Optical Fiber Communications", Journal of Optical Communications 4 (1983), 51–62.

Hegarty et al., "Low-Loss Single-Wavelength-Division Multiplexing with Etched Fibre Arrays", ELECTRONICS LETTERS, Aug. 16, 1984, vol. 20, No. 17, pp. 685–686.

Primary Examiner—Joseph A. Orsino
Assistant Examiner—L. Van Beek
Attorney, Agent, or Firm—Sughrue, Mion, Zinn, Macpeak & Seas

[57] ABSTRACT

An optical wavelength-division multiplex transmission system having an optical filter (100) for filtering spontaneous emission noise from an optically multiplexed signal which has been amplified by an optical amplifier (622), which can be a laser amplifier or a fiber Raman amplifier. The output signal from the optical filter may be further amplified by a second optical amplifier (624), and the second amplified signal may be sent to a further optical filter. The optical filter includes an optical demultiplexer and an optical multiplexer, and can be a Fabry-Perot interferometer or a Mach-Zehnder interferometer. The optical filter is for transmitting passbands with center wavelengths corresponding to those of the wavelengths of the optical signals to be transmitted by the optical wavelength-division wavelength multiplex transmission system.

15 Claims, 5 Drawing Sheets

OPTICAL WAVELENGTH-DIVISION MULTIPLEX TRANSMISSION SYSTEM WITH AN OPTICAL FILTER FOR SPONTANEOUS EMISSION NOISE

This is a continuation of application Ser. No. 07/039,193, filed Apr. 16, 1987 now abandoned.

BACKGROUND OF THE INVENTION

The present invention relates to an optical wavelength-division multiplex transmission system for transmitting information using a plurality of optical signals having different wavelengths.

There has been an increasing demand for an optical fiber transmission system has been increasing for transmission of a wide band signal such as video signals, and/or a large capacity signal through transoceanic links. In such an optical fiber transmission system, however, a distance between an electro-optical (E/O) converter and an opto-electrical (O/E) converter is limited due to a transmission loss in the optical fiber. In order to solve this problem, an optical transmission system has been proposed by J. C. Simon in an article entitled "Semiconductor Laser Amplifier for Single Mode Optical Filter", Journal of Optical Communications, vol. 2, pp. 51–61, April 1983 (Reference 1). In the article, an optical amplifier is used to expand the interval distance by amplifying a single optical signal as it is. Since the optical amplifier produces spontaneous emission noise during amplification of the optical signal, Simon uses an optical filter to remove the spontaneous emission noise.

In addition, according to the fact that a single optical fiber can transmit a plurality of optical signals having different wavelengths, an optical wavelength-division multiplex (WDM) transmission system has been studied in which optical signals supplied from individual E/O conventers are combined into the single optical fiber for transmission of much information.

The WDM transmission system is also restricted in an interval distance between the E/O and O/E converters. Therefore, it may be also desirable in the WDM system to provide a laser amplifier to increase the light power, as used in the single wavelength system. However, it has been never proposed to use such a laser amplifier in an optical WDM transmission system.

Further, the WDM transmission system has the problem that the optical amplifier used therein tends to be more saturated by the spontaneous emission noise and the optical signals transmitted to the amplifier than the optical amplifier used in the single wavelength system. Accordingly, unless the noise is suitably suppressed, the optical signal in the WDM transmission system can not be amplified satisfactorily. This problem has never been considered.

SUMMARY OF THE INVENTION

An object of the present invention is to provide a wavelength-division multiplex transmission system using laser amplifiers.

Another object of the present invention is to provide an optical wavelength-division multiplex transmission system using laser amplifiers and optical filters for removing spontaneous emission noise produced in the amplifiers.

The above objects can be achieved according to the present invention by providing a wavelength-division multiplex transmission system comprising optical multiplexing means for multiplexing a plurality of optical signals having different wavelengths into a wavelength-division multiplexed optical signal, optical amplifier means for amplifying, as a whole, the wavelength-division multiplexed optical signal supplied from the optical multiplexing means, and optical filter means arranged between adjacent ones of the optical amplifier means for suppressing undesired spectra of an output optical signal supplied from the optical amplifier means.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
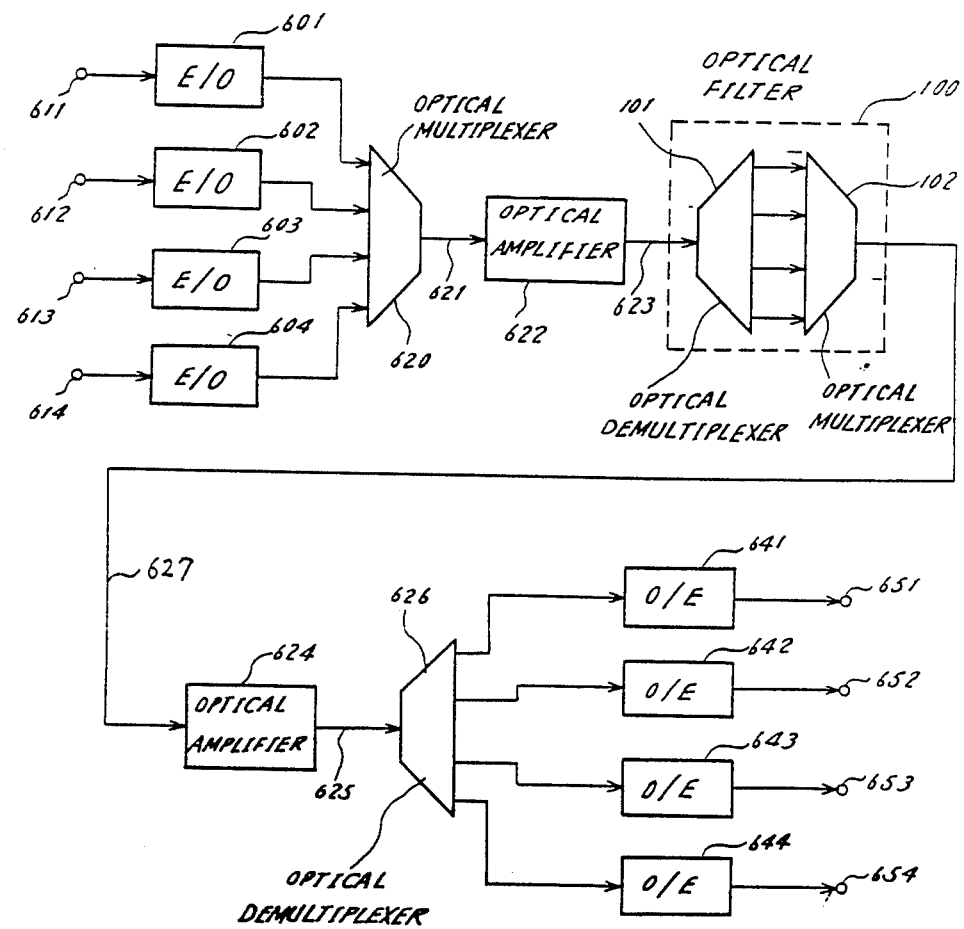
FIG. 1 is a schematic block diagram of an embodiment of the present invention.

In FIG. 1, electric signals at input terminals 611 to 614 at a transmission side are converted, by E/O converters 601 to 604, to optical signals having wavelengths $\lambda_1$, $\lambda_2$, $\lambda_3$, and $\lambda_4$ which are, for example, 1540 nm, 1545 nm, 1550 nm and 1555 nm, respectively. An optical multiplexer 620 multiplexes the four optical signals from the E/O converters 601 to 604 into a wavelength-division multiplex (WDM) signal which is sent to an optical fiber 621. The WDM signal undergoes transmission loss during its propagation through the optical fiber 621. An optical amplifier 622 amplifies the WDM signal to recover an original light power and then the signals to an optical fiber 623. The optical amplifier 622 may be a laser amplifier described in the aforementioned Reference 1 or a fiber Raman amplifier. An optical filter 100 functions to remove spontaneous emission noise from the amplified WDM signal. The optical filter 100 includes an optical demultiplexer 101 for demultiplexing the four optical signals having wavelengths substantially equal to the wavelengths $\lambda_1$, $\lambda_2$, $\lambda_3$ and $\lambda_4$ from the WDM signal, respectively, and an optical multiplexer 102 for multiplexing the four optical signals into the WDM signal again. Thus, the optical filter 100 can selectively pass through only the optical signals having spectra of substantially $\lambda_1$, $\lambda_2$, $\lambda_3$ and $\lambda_4$. The optical demultiplexer 101 and multiplexer 102 may be an optical multiplexer/demultiplexer described in, for example, "Low-Loss Single Mode Wavelength-Division Multiplexing With Etched Fibre Arrays", Electronics Letters, Vol. 20, No. 17, pp. 685–686, August 1984 (Reference 2).

The WDM signal from the optical filter 100 undergoes transmission loss during its propagation along an optical fiber 627. An optical amplifier 624 amplifies the WDM signal from the filter 100 to compensate for the transmission loss and then sends the amplified WDM signal to an optical demultiplexer 626 at a reception side. The optical demultiplexer 626 demultiplexes from the WDM signal the individual optical signals whose center wavelength are $\lambda_1$, $\lambda_2$, $\lambda_3$ and $\lambda_4$. The O/E converters 641 to 644 convert the individual optical signals into the original electric signals which are provided at output terminals 651 to 654, respectively.

Figure 2A:
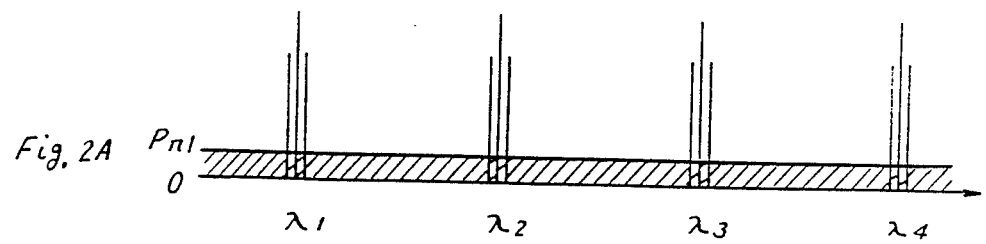
FIG. 2A shows spectra of input light to an optical amplifier.
Figure 2B:
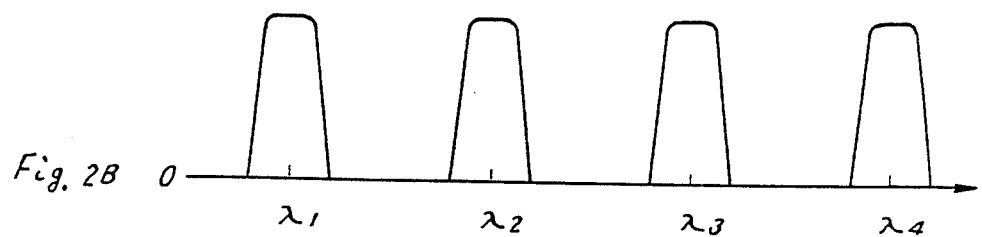
FIG. 2B illustrates a transmission characteristic of an optical filter.
Figure 2C:
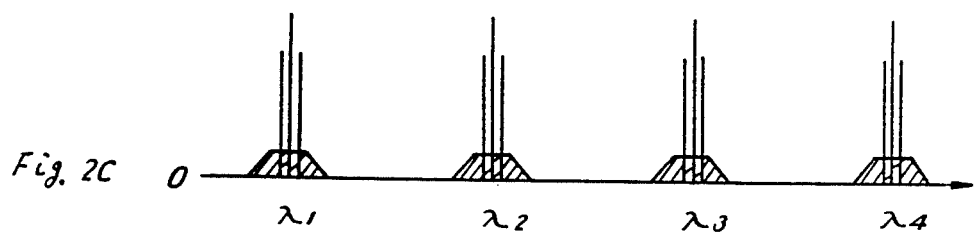
FIG. 2C shows spectra transmitted by the optical filter.

FIGS. 2A to 2C are charts for explaining an operation of the optical filter 100 shown in FIG. 1. Spectra of the output optical signal supplied from the optical amplifier 622 are composed of spectra having wavelength near $\lambda_1$, $\lambda_2$, $\lambda_3$ and $\lambda_4$ and spontaneous emission noise produced in the optical amplifier 622. The light power of the noise is $P_{n1}$ and its spectrum is uniform with wavelength.

A filter characteristic of the filter 100 has passbands whose center wavelengths are $\lambda_1$, $\lambda_2$, $\lambda_3$ and $\lambda_4$, respectively, as shown in FIG. 2B. Therefore, when the WDM signal having spectra as shown in FIG. 2A is supplied to the optical filter 100, the filter 100 provides at its output spectra shown in FIG. 2C. That is, the spontaneous emission noise except for portions around wavelengths $\lambda_1$, $\lambda_2$, $\lambda_3$ and $\lambda_4$ is removed by the optical filter 100. Since the noise is produced in each optical amplifier and accumulated along the transmission line, the accumulated total noise power may become higher than the signal level at an input of a subsequent optical amplifier. This results in an insufficient amplification of the signal light due to a saturation of the latter amplifier.

The optical filter 100 used in the present invention reduces the noise level to relatively increase the signal level at the input of the optical amplifier 624 and thereby enabling to extend the distance between the amplifiers 622 and 624.

It is preferable to arrange an optical filter between the optical amplifier 624 and the optical demultiplexer 626 to remove optical noise produced in the amplifier 624 for longer optical transmission.

Although the optical filter 100 shown in FIG. 1 is arranged downstream of the optical amplifier 622, the filter may be arranged upstream to the amplifier 622 with the same effect.

Figure 3:
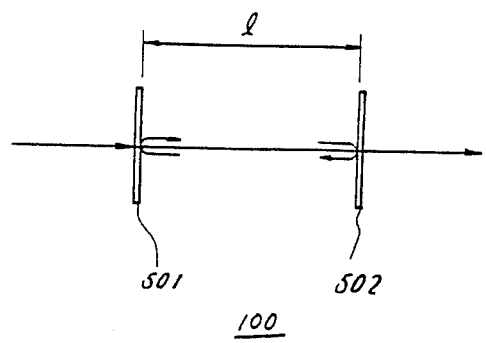
FIGS. 3 and 5 show other examples of the optical filter.

FIG. 3 shows the optical filter 100 in the form of Fabry-Perot interferometer. In FIG. 3, the Fabry-Perot interferometer comprises a pair of parallel reflecting mirrors 501 and 502 separated from each other by a distance l. An input light passed through the reflecting mirror 501 is reflected by the mirror 502 and then by the mirror 501 and so on. The Fabry-Perot interferometer allows only the wavelengths $\lambda_i$ (i=1, 2, 3, ...) to pass through the reflecting mirror 502 as an output light:

$$\lambda_i = \frac{2nl}{i}$$

where n is refractive index of a material between the mirrors 501 and 502.

Figure 4:
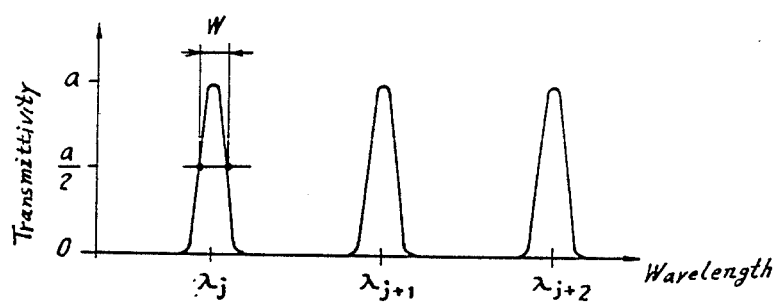
FIGS. 4 and 6 are filter characteristics of the optical filters shown in FIGS. 3 and 5, respectively.

FIG. 4 is a graph showing a light transmittivity vs. wavelength characteristic. As is apparent from FIG. 4, the transmittivity periodically takes a peak value a at the wavelength $\lambda_j$, $\lambda_{j+1}$ and $\lambda_{j+2}$. The half-value width W can be represented by:

$$W = \frac{2\pi nl}{c} \cdot \frac{R}{1-R}$$

where R is a reflecting coefficient of the mirrors 501 and 502 and c is the velocity of light. By selecting the value of R suitably, the transmitted spectra width is determined so that only around wavelengths $\lambda_j \sim \lambda_{j+2}$ having the peak transmittivity are passed.

Figure 5:
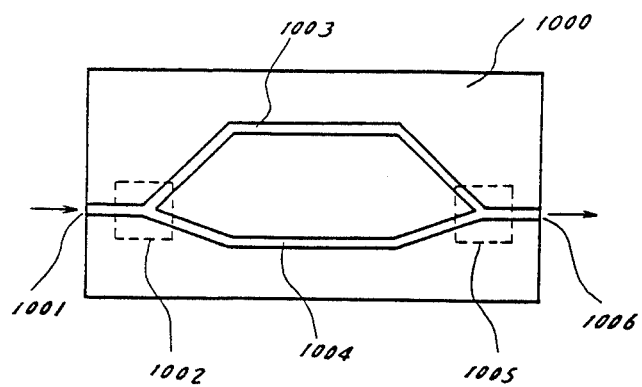
Figure 6:
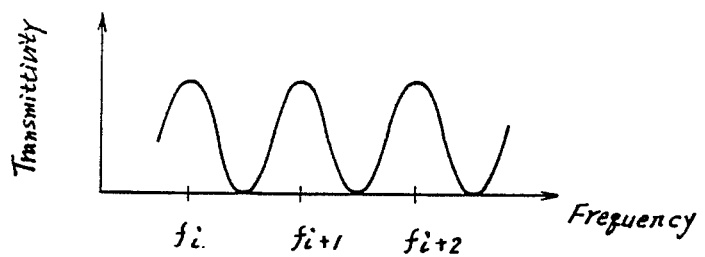

FIG. 5 shows the optical filter 100 implemented by a Mach-Zehnder interferometer. The Mach-Zehnder interferometer comprises a glass substrate 1000, a Y branch 1002 formed thereon, a Y coupler 1005 also formed on the substrate and waveguides 1003 and 1004 formed between the Y branch and coupler. An input light coming into an end surface 1001 is branched by the Y branch 1002 to the waveguides 1003 and 1004. These two input light components are combined at the Y coupler 1005, interfere with each other, and appears at an opposite end surface 1006 of the substrate 1000 as a combined output light. When a length of the waveguide 1003 is different from that of the waveguide 1004, the output light differs in intensity depending upon the frequencies. The light having wavelengths $\lambda_i$ or frequencies $f_i$ (i=1, 2, 3, ...) represented by the following equation is strengthened by interference:

$$f_i = \frac{c \cdot i}{2 \cdot \Delta L \cdot n}$$

where $\Delta L$ is a difference in length between the waveguides 1003 and 1004; f, a frequency of the input light; and n, refractive index of the waveguides. Transmittivity of this interferometer can be represented by:

$$T = k \cdot \sin^2 (2 \cdot \Delta L \cdot f_i \cdot n/c)$$

where k is a constant. FIG. 6 illustrates a relationship between frequencies and transmittivity.

Figure 7A:
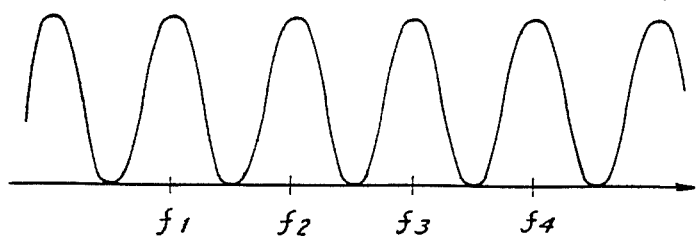
FIGS. 7A to 7E are waveforms for explaining an operation of the optical filter shown in FIG. 5.
Figure 7B:
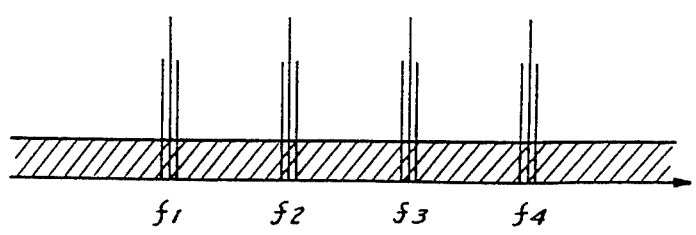
Figure 7C:
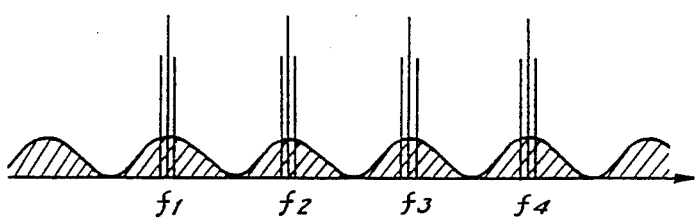

An operation of the Mach-Zehnder interferometer will be described with reference to FIGS. 7A to 7E. It is assumed that the Mach-Zehnder interferometer type filter 100 has a frequency selectivity as shown in FIG. 7A and that frequencies of the optical signals are $f_1$, $f_2$, $f_3$ and $f_4$, respectively. When the WDM optical signal having spectra shown in FIG. 7B is supplied to the filter 100, it provides spectra as shown in FIG. 7C. As apparent from FIG. 7C, an average value of the noise is reduced by about 50% of that shown in FIG. 7B.

Figure 7D:
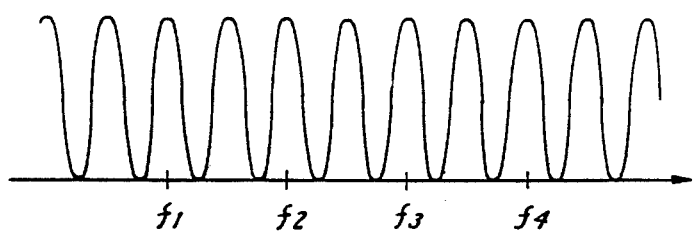
Figure 7E:
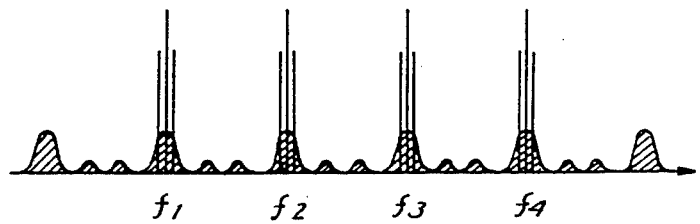

The noise suppression is enhanced by further arranging an additional Mach-Zehnder interferometer having a characteristic of FIG. 7D. An output spectrum thereof becomes as shown in FIG. 7E.

What is claimed is:

1. An optical wavelength-division multiplex transmission system comprising optical multiplexer means (620) for multiplexing a plurality of optical signals having different wavelengths into a wavelength-division multiplexed optical signal, optical amplifier means (622) optically coupled to said optical multiplexer means for directly amplifying said wavelength-division multiplexed optical signal without resort to opto-electric and electro-optic conversions to produce an amplified wavelength-division multiplexed optical signal, optical filter means (100) optically coupled to said optical amplifier means for suppressing undesired spectra of the amplified wavelength-division multiplexed optical signal to produce a filtered wavelength-division multiplexed optical signal, and optical demultiplexer means (626) optically coupled to said optical filter means for demultiplexing said filtered wavelength-division multiplexed optical signal into a plurality of optical signals each having a different frequency component.

2. The optical wavelength-division multiplex transmission system as claimed in claim 1, wherein said optical filter means comprises interferometer means having predetermined pass-bands, said wavelengths of said optical signals corresponding to center wavelengths of said pass-bands of said interferometer means.

3. An optical wavelength-division multiplexed transmission system for transmitting a plurality of optical signals having different wavelengths, said system comprising:
(a) input optical mulitplexer means (62) for multiplexing the optical signals to form a wavelength-division multiplexed optical signal;
(b) first optical amplifier means (622) optically coupled to said optical multiplexer means for directly amplifying the wavelength-division multiplexed optical signal without resort to opto-electric and electro-optic conversions to produce a first amplified wavelength-division mutliplexed optical signal;
(c) optical filter means (100) optically coupled to said optical amplifier means for suppressing undesired spectra of the first amplified wavelength-division multiplexed optical siganl to produce a filtered wavelength-division multiplexed optical signal;
(d) second optical amplifier means (624) optically coupled to said optically filter means for amplifying the filtered wavelength-division multiplexed optical signal to produce a second amplified wavelength-division multiplexed optical signal; and
(e) optical demultiplexer means (626) optically coupled to said second optical amplifier means for demultiplexing said second amplified wavelength-division multiplexed optical signal into a plurality of optical signals each having a different frequency component.

4. The optical wavelength-division multiplex transmission system as claimed in claim 3, wherein said first and second optical amplifier means are one of the laser amplifiers and fiber Raman amplifiers.

5. The optical wavelength-division multiplex transmission system as claimed in claim 3, wherein said optical filter means comprises a filter optical demultiplexer (101) for demultiplexing the multiplexed signal from said first optical amplifier means and a filter optical mulitplexer (102) for multiplexing the demultiplexed signal from said filter optical demultiplexer.

6. The optical wavelength-division multiplex transmission system as claimed in claim 5, wherein said filter optical demodulator has predetermined pass-bands for passing only the wavelengths of the optial signals corresponding to center wavelengths of said pass-bands of said filter optical demodulator.

7. The optical wavelength-division multiplex transmission system as claimed in claim 3, wherein said optical filter means has predetermined pass-bands for passing only the wavelengths of the optical signals corresponding to center wavelengths of said pass-bands of said optical filter means.

8. The optical wavelength-division multiplex transmission system as claimed in claim 3, further comprising additional optical filter means for suppressing undesired spectra of the multiplexed signal from said second optical amplifier means.

9. The optical wavelength-division multiplex transmission system as claimed in claim 8, further comprising output optical demultiplexer means for demultiplexing the multiplexed signal from said additional optical filter means into the plurality of optical signals.

10. The optical wavelength-division multiplex transmission system as claimed in claim 3, further comprising output optical demultiplexer means (626) for demultiplexing the multiplexed signal from said second optical amplifier means into the plurality of optical signals.

11. The optical wavelength-division multiplex transmission system as claimed in claim 3, wherein said optical filter means comprises a Fabry-Perot interferometer having first and second parallel reflecting mirrors (501,502) separated by a predetermined distance, with respective reflective surfaces of said first and second mirrors facing one another.

12. The optical wavelength-division multiplex transmission system as claimed in claim 11, wherein a refractive material is disposed between said first and second mirrors, and said second mirror permits only light wavelengths equal to $\lambda_i$ determined according to the following equation:

$$\lambda_i = 2\ nl/i$$

wherein i=positive intergers, n=a refractive index of said refractive material and l=a distance between said first and second mirrors.

13. The optical wavelength-division multiplex transmission system as claimed in claim 3, wherein said optical filter means comprises a Mach-Zehnder interferometer.

14. The optical wavelength-division multiplex transmission system as claimed in claim 13, wherein said Mach-Zehnder interferometer comprises a glass substrate (1000) having an input end surface (1001) for receiving the multiplexed signal from said first optical amplifier means, a Y-branch (1002) for splitting the multiplexed signal from said first optical amplifier means into first and second optical signals, first and second waveguides (1003,1004) for transmitting the first and second optical signals, respectively, a Y-coupler (1005) for coupling said first and second optical signals from said first and second waveguides, respectively, and an output end surface (1006) at which the coupled first and second optical signals are outputted, a length of the first waveguide being a desired amount different from a length of the second waveguide and the waveguides having a desired refractive index, such that a desired transmittivity of the interferometer is achieved to achieve a desired frequency selectivity.

15. The optical wavelength-division multiplex transmission system as claimed in claim 14, wherein said optical filter means further comprises an additional Mach-Zehnder interferometer having a frequency selectivity different from that of said desired frequency selectivity, said additional Mach-Zehnder interferometer being arranged in the rear of said Mach-Zehnder interferometer.

* * * * *

UNITED STATES PATENT AND TRADEMARK OFFICE
CERTIFICATE OF CORRECTION

PATENT NO. : 4,945,531

DATED : July 31, 1990

INVENTOR(S) : Syuji Suzuki

It is certified that error appears in the above-identified patent and that said Letters Patent is hereby corrected as shown below:

Column 3, line 59, delete "a" (second occurrence), and insert --a--.

Column 5, line 22, delete "siganl", and insert --signal--.

Column 5, line 46, delete "mulitplexer", and insert --multiplexer--.

Column 5, line 51, delete "optial", and insert --optical--.

Signed and Sealed this

Fifth Day of November, 1991

Attest:

HARRY F. MANBECK, JR.

*Attesting Officer*  *Commissioner of Patents and Trademarks*